United States Patent [19]

Higuchi et al.

[11] 4,007,313
[45] Feb. 8, 1977

[54] MAGNETIC RECORDING MEDIUM

[75] Inventors: Shigetaka Higuchi; Yoshiaki Hisagen, both of Sendai; Minoru Takamizawa; Masatoshi Takita, both of Annaka, all of Japan

[73] Assignees: Sony Corporation, Tokyo, Japan; Shin-Etsu Chemical Co., Inc., both of Tokyo, Japan

[22] Filed: Oct. 1, 1975

[21] Appl. No.: 618,368

[30] Foreign Application Priority Data

Oct. 2, 1974 Japan .......................... 49-114391

[52] U.S. Cl. .................. 428/447; 252/62.51; 252/62.52; 252/62.56; 252/49.6; 260/408; 427/127; 427/128; 427/131; 428/451; 428/446; 428/900; 428/405; 428/539; 428/480

[51] Int. Cl.² ...................... H01F 1/37; B32B 9/04

[58] Field of Search .......... 428/446, 451, 447, 449, 428/900, 405, 539, 480; 252/62.51, 62.52, 62.56, 49.6; 427/127, 128, 131; 260/408

[56] References Cited

UNITED STATES PATENTS

| 3,423,233 | 1/1969  | Akashi .................... 428/447 |
| 3,484,286 | 12/1969 | Beck ...................... 428/900 |
| 3,497,411 | 2/1970  | Chebiniak ................ 428/900 |
| 3,547,693 | 12/1970 | Huguenard ................ 428/900 |
| 3,775,171 | 11/1973 | Hermes .................... 428/446 |
| 3,794,556 | 2/1974  | Young ..................... 428/447 |

*Primary Examiner*—George F. Lesmes
*Assistant Examiner*—Ellis P. Robinson
*Attorney, Agent, or Firm*—Hill, Gross, Simpson, Van Santen, Steadman, Chiara & Simpson

[57] ABSTRACT

A magnetic recording medium including a flexible nonmagnetic film base and a magnetic layer thereon which contains and/or is coated with an organosilicon compound having lubricating properties, said compound having the following formula:

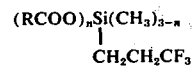

where R is a saturated or unsaturated aliphatic group having from 7 to 17 carbon atoms and n is an integer from 1 to 3. The static friction coefficient and the tendency of the magnetic layer to shed powder are both substantially reduced in the improved magnetic recording medium of the present invention.

8 Claims, 1 Drawing Figure

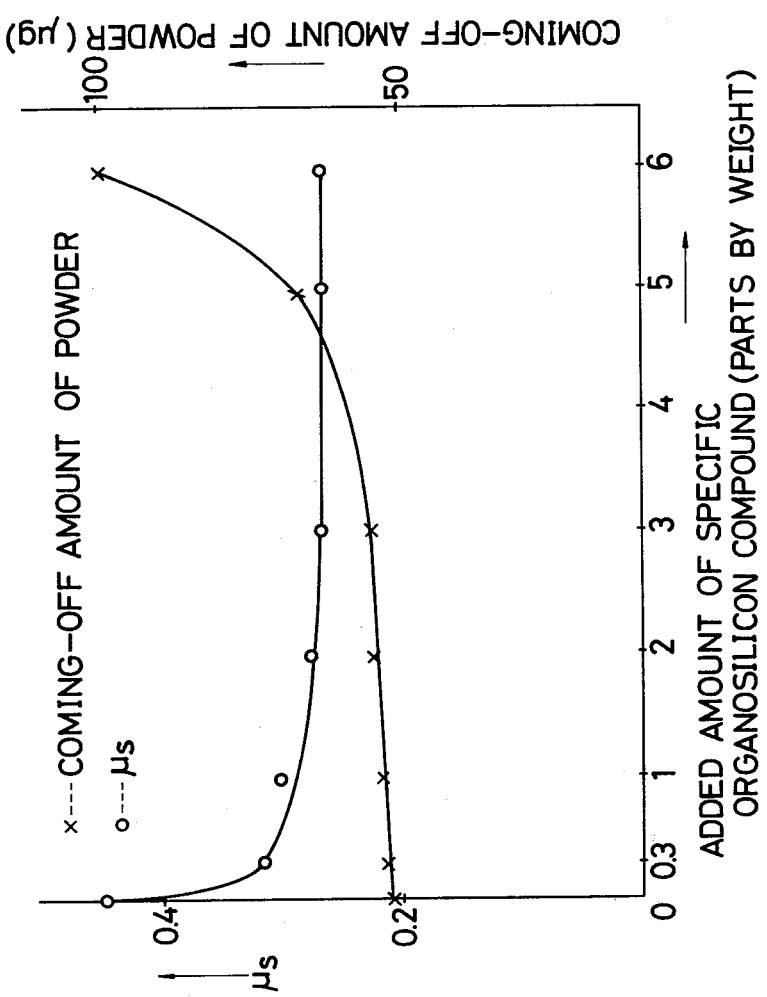

MAGNETIC RECORDING MEDIUM

BACKGROUND OF THE INVENTION

1. Field of the Invention

The present invention relates to a magnetic recording medium having a flexible non-magnetic film base and a magnetic layer thereon comprising magnetizable particles dispersed in a resinous binder in combination with a fluorinated silane ester as a lubricant.

2. DESCRIPTION OF THE PRIOR ART

A magnetic recording medium whether used for audio recording, video recording, or other magnetic recording purposes comes in contact with tape guide members, magnetic heads and the like during use. In the case of a video tape recorder, where high tape velocities are encountered, the tape must have a sufficient wear resistance and a relatively small friction coefficient if it is to run smoothly and steadily for a long time. Magnetic recording tape which has an increased friction coefficient vibrates at the tape guide members and at the magnetic heads during the recording operation or the reproducing operation, so that the recorded signals or the reproduced signals are distorted from the originals. In some cases, a so-called "Q" sound due to vibration of the magnetic recording tape is encountered.

Efforts have been made to overcome the above-described defects and to impart lubricity or smoothness to the magnetic recording tape, but no completely satisfactory lubricant for magnetic recording tapes has yet been obtained. For example, it has been suggested to use lubricants such as a silicone fluid, castor oil, molybdenum disulfide, graphite, higher fatty acids or the like, the lubricant being mixed into a magnetic layer containing a magnetic powder such as gamma ferric oxide and a binder such as polyvinyl chloride. Magnetic recording tapes containing such lubricants exhibit some wear resistance, but not to a sufficient degree. When a large quantity of the lubricant is mixed into the magnetic layer in order to further increase the wear resistance, a so-called "blooming" occurs on the magnetic layer. The blooming results from the lubricating agent exuding on the surface of the magnetic layer and becoming separated therefrom. As a result, the surface of the magnetic recording tape gets rough, and more powder comes off from the magnetic recording layer.

SUMMARY OF THE INVENTIION

In accordance with the present invention, a magnetic recording medium is provided with a flexible non-magnetic film base and a magnetic layer thereon including magnetizable particles dispersed in a resinous binder, the magnetic layer containing and/or being coated with an organosilicon compound having the formula:

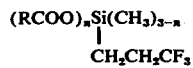

where R is a saturated or unsaturated aliphatic group, typically a straight chained aliphatic group, having from 7 to 17 carbon atoms, and $n$ is an integer in the range of 1 to 3.

BRIEF DESCRIPTION OF THE DRAWING

The single drawing is a graph showing the relationship between the amount of organosilicon compound and the resulting static friction coefficient, and amount of powder coming off the recording medium upon abrasion.

DESCRIPTION OF THE PREFERRED EMBODIMENTS

The magnetic recording tape of the present invention has superior wear resistance. Its friction coefficient is reduced, and its lubricity or smoothness is improved. Accordingly, the magnetic recording tape of the present invention can run smoothly and steadily for a long time.

The organosilicon compound used in accordance with the present invention is a fatty acid ester silane having a chemical bond binding an aliphatic acidic group to a silicon atom, and has a molecular structure which is hard to crystallize. Accordingly, the melting point of the organosilicon compound is generally low. It has been found that the magnetic recording tape can be improved as far as its resistance to blooming and powder shedding is concerned by adding such organosilicon compounds into the magnetic layer itself and/or by coating the magnetic layer with the organosilicon lubricant. Moreover, the molecule of the organosilicon compound has a trifluoropropyl group directly bonded to the silicon atom. Accordingly, it can be expected that the surface energy of the magnetic layer is greatly reduced and thereby the smoothness or lubricity of the magnetic recording tape is greatly improved.

The aliphatic group R, as mentioned, should have a carbon atom ranging from 7 to 17 in number. When the number of carbon atoms is less than 7, the friction coefficient of the tape is too large while when the number of carbon atoms is more than 17, blooming occurs and the powder has a greater tendency to come off the magnetic layer.

Preferably, from 0.3 to 5 parts by weight of the organosilicon compound are added to 100 parts by weight of magnetic powder such as gamma ferric oxide. When more than 5 parts by weight of the organosilicon compound are added to the magnetic powder, the strength of the magnetic layer is reduced. Consequently, the powder tends to come off more readily although the friction coefficient is reduced. When less than 0.3 parts by weight of the organosilicon compound are used, the organosilicon compound does not provide a sufficient lubricity to the magnetic recording tape and the friction coefficient is not sufficiently reduced.

Any conventional magnetizable particles can be used in accordance with the present invention including materials such as gamma ferric oxide, magnetite, chromium dioxide, or iron-cobalt alloys. Similarly, any of the conventionally used resinous binders can be employed for the purposes of the present invention, such as vinyl chloride-vinyl acetate copolymer resin in combination with a polyurethane resin. Likewise, antistatic agents of the type generally used in magnetic recording tapes can also be used. Carbon black is one example of antistatic agents. Furthermore, dispersing agents such as lecithin can be added to the magnetic layer in accordance with conventional practice.

The organosilicon compounds of the present invention can be synthesized in several ways. For example, a chlorosilane having a trifluoropropyl group can be reacted with a fatty acid in the presence of a dehydrochlorination agent such as an amine to produce a reaction product according to the following equation:

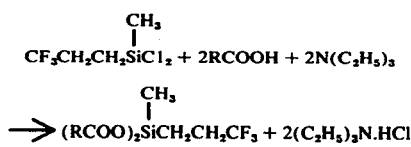

This organosilicon compound can be produced at a high yield rate.

Another method for synthesizing the organosilicon compounds of the present invention involves reacting an alkoxylsilane having a trifluoropropyl group with a fatty acid in the presence of an acidic or basic catalyst, according to the following equation:

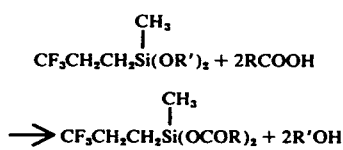

where R' represents an alkyl group such as a methyl group or an ethyl group.

There is some tendency that the organosilicon compounds produced according to the methods described above may be hydrolyzed by water. However, this tendency is negligible in the absence of strong acid or base. While the number of carbon atoms in the aliphatic group R is more than 6, the organosilicon compound is more stable. It has been found that the magnetic recording tape according to the present invention is sufficiently stable against the effects of water under normal conditions of use.

The following specific examples are submitted to illustrate the invention. In the examples parts are all parts by weight.

EXAMPLE 1

A magnetic composition having the following ingredients was prepared:

| | |
|---|---|
| Ferromagnetic ferric oxide (gamma-$Fe_2O_3$) powder | 100 parts |
| "VAGH" Vinylchloride-vinylacetate copolymer resin (Union Carbide) | 20 parts |
| "Nipporan-3022" polyurethane resin (Nippon Polyurethane Co.) | 10 parts |
| Carbon black | 0.5 parts |
| Lecithin | 1.0 part |

Two parts of each organosilicon compound shown in Table 1 were added into the above-identified composition. Samples Nos. 1 to 5 in Table 1 involved the use of organosilicon compounds in which R contained 7, 9, 13, 15 and 17 carbon atoms, respectively, and n was 2 in each case. Samples Nos. 6 and 7 in Table 1 involved the use of organosilicon compounds in which R contained 5 and 19 carbon atoms, respectively, and n was 2. Sample No. 8 represents a conventional silicone fluid used for lubricating purposes on magnetic recording tapes.

The magnetic composition containing the organosilicon compound was mixed with 300 parts of a solvent mixture of methylethylketone and methylisobutylketone in a 1 : 1 weight ratio in a ball mill for 24 hours. The resulting mixtures were applied to a thickness of 10 microns onto polyethylene terephthalate films to form magnetic recording tapes described as samples Nos. 1 to 8.

The static friction coefficient was measured by training the tapes over ¼ of the periphery of a brass cylinder. A constant tension was applied to the tape and the sample was pulled very slowly about the periphery. The tension at the moment the sample started to slip was then measured. The static friction coefficient ($\mu_s$) was calculated by the following equation:

$$\mu_s = \frac{2}{\pi} \ln \frac{T_2}{T_1}$$

where $T_2$ is the tension at the moment of slippage and $T_1$ is the originally applied tension.

The measurement of amount of powder coming off was done by comparing the difference in weight between the abraided sample and a nonabraided sample of the same composition. The samples were also tested for "Q" sound, and the results are reproduced in Table 1, where dimethylsilicone fluid was used as the reference (sample No. 8) of which trade mark is KF-96 (manufactured by Shin-Etsu Chem. Co., Ltd. in Japan), having 500 ± 25 cS of the viscosity at 25° C and from 0.965 to 0.975 of the specific gravity.

TABLE 1

| Sample No. | Organosilicon compound | Static friction coefficient, $\mu_s$ | Coming-off amount of powder, micrograms | Q sound |
|---|---|---|---|---|
| 1 | $(C_7H_{15}COO)_2SiCH_3$<br>\|<br>$CH_2CH_2CF_3$ | 0.273 | 60 | very slight |
| 2 | $(C_9H_{19}COO)_2SiCH_3$<br>\|<br>$CH_2CH_2CF_3$ | 0.283 | 55 | very slight |
| 3 | $(C_{13}H_{27}COO)_2SiCH_3$<br>\|<br>$CH_2CH_2CF_3$ | 0.279 | 52 | very slight |
| 4 | $(C_{15}H_{31}COO)_2SiCH_3$<br>\|<br>$CH_2CH_2CF_3$ | 0.300 | 63 | very slight |

TABLE 1-continued

| Sample No. | Organosilicon compound | Static friction coefficient, $\mu_s$ | Coming-off amount of powder, micrograms | Q sound |
|---|---|---|---|---|
| 5 | $(C_{17}H_{35}COO)_2SiCH_3$<br>\|<br>$CH_2CH_2CF_3$ | 0.315 | 56 | very slight |
| 6 | $(C_5H_{11}COO)_2SiCH_3$<br>\|<br>$CH_2CH_2CF_3$ | 0.450 | 120 | a little |
| 7 | $(C_{19}H_{39}COO)_2SiCH_3$<br>\|<br>$CH_2CH_2CF_3$ | 0.318 | 100 | very slight |
| 8 | Dimethylsilicone fluid (viscosity 500±25 cS at 25° C specific gravity 0.965 to 0.975) | 0.400 | 340 | a little |

As apparent from Table 1, the conventional lubricating composition identified as sample No. 8 evidenced a relatively large static friction coefficient, a relatively large amount of powder loss and a high "Q" sound. On the other hand, the samples made according to the present invention, i.e., samples Nos. 1 to 5 had small static friction coefficients, negligible "Q" sound, and negligible powder loss. The wear resistance of these samples was greatly improved and they could be run smoothly and steadily. In the case of sample No. 7, where the R group contained more than 17 carbon atoms, blooming occurred and the amount of powder loss was large although friction coefficient was small. In the case of sample No. 6, where the number of carbon atoms in the group R is less than 7, the static friction coefficient was increased.

EXAMPLE 2

An organosilicon compound comprising an unsaturated aliphatic group R having 17 carbon atoms was prepared. In this case, the integer n was equal to 2. The sample prepared using this organosilicon compound is identified as sample No. 9 in Table 2. Sample No. 10 was used for comparison but had no organosilicon compound in the magnetic composition. Sample No. 11 represented a conventional silicone lubricant. The organosilicon compounds of samples Nos. 9 and 11 were mixed with the magnetic composition as in Example 1. The following test results were obtained from these three samples. The results are shown in Table 2, where methylphenylsilicone fluid was used as the reference (sample No. 11) of which trade mark is KF54 (manufactured by Shin-Etsu Chem. Co., Ltd. in Japan), having 400 ± 50 cS of the viscosity at 25° C and from 1.06 to 1.08 of the specific gravity.

TABLE 2

| Sample No. | Organosilicon compound | Static friction coefficient, $\mu_s$ | Coming-off amount of powder, micrograms | Q sound |
|---|---|---|---|---|
| 9 | $(C_{17}H_{33}COO)_2SiCH_3$<br>\|<br>$CH_2CH_2CF_3$ | 0.283 | 50 | very slight |
| 10 | None | 0.450 | 52 | considerable |
| 11 | Methylphenylsilicone fluid (viscosity 400 ± 50 cS at 25° C, specific gravity 1.06 to 1.08) | 0.443 | 350 | considerable |

From Table 2 it will be seen that sample No. 9 was superior in both the static friction coefficient although the amount of powder loss was small. Sample No. 11 was inferior in static friction coefficient, amount of powder loss, and in "Q" sound.

EXAMPLE 3

Three types of organosilicon compounds in each of which R had 13 carbon atoms were prepared. The value of n was varied from 1 to 2 to 3. Magnetic recording tapes identified as samples Nos. 12, 13 and 14 were formed for testing purposes in the same manner as in Example 1. The results of these tests are shown in Table 3.

TABLE 3

| Sample No. | Organosilicon compound | Static friction coefficient, $\mu_s$ | Coming-off amount of powder, micrograms | Q sound |
|---|---|---|---|---|
| 12 | $C_{13}H_{27}COOSi(CH_3)_2$<br>\|<br>$CH_2CH_2CF_3$ | 0.282 | 49 | none |
| 13 | $(C_{13}H_{27}COO)_2SiCH_3$<br>\|<br>$CH_2CH_2CF_3$ | 0.277 | 52 | none |
| 14 | $(C_{13}H_{27}COO)_3Si$<br>\|<br>$CH_2CH_2CF_3$ | 0.260 | 60 | none |

As apparent from Table 3, these tapes were satisfactory in all respects as the value of n was varied from 1 to 3.

EXAMPLE 4

The organosilicon compound of sample No. 13 was added to the magnetic composition in amounts varying from 0 to 6 parts per 100 parts magnetic powder. The static friction coefficient and the amount of powder coming off were tested. The results of the test are shown in the drawing.

As evident from the drawing, both the static friction coefficient and the amount of powder coming off were satisfactorily small at amounts of 0.3, 1, 2, 3 and 5 parts and particularly in the range of 0.5 to 2.5 parts. The amount of powder coming off rapidly increased when the amount added exceeded 5 parts while the static friction coefficient was quite large when the amount of the organosilicon compound added was less than 0.3 parts.

EXAMPLE 5

A polyethylene terephthalate film was coated with the magnetic composition prepared as in Example 1 but without addition of the organosilicon compound to form a magnetic layer. Then the magnetic layer was coated with an isopropyl alcohol solution containing 1% of the organosilicon compound

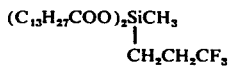

The static friction coefficient of the magnetic recording tape thus produced was 0.253 and the amount of powder coming off was 50 micrograms. Thus, satisfactory results were obtained when using the lubricant as a coating rather than incorporating it into the body of the magnetic composition.

Although several specific examples of the invention have been described, it should be understood that modifications can be made to the specific examples. For example, the aliphatic group R of the organosilicon compound may have a plurality of double bonds. Furthermore, two or more of the organosilicon compounds as defined herein can be used in the magnetic layer in combination From the foregoing it will be understood that the magnetic recording medium produced according to the present invention has increased wear resistance, resistance to blooming, and resistance to powder loss. Since the organosilicon compound imparts sufficient lubricity to the magnetic layer, the friction coefficient can be greatly reduced, the generation of "Q" sound can be prevented, and the magnetic recording tape can be run steadily for long periods of time.

We claim as our invention:

1. In a magnetic recording medium having a non-magnetic base and a magnetic layer formed thereon containing magnetizable particles dispersed in a resinous binder, the improvement comprising said magnetic layer having an organosilicon compound represented by the formula

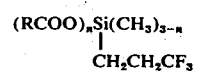

where R is an aliphatic group having from 7 to 17 carbon atoms and n is an integer from 1 to 3, said organosilicon compound being present in an amount sufficient to provide lubricating properties to said magnetic layer.

2. A magnetic recording medium according to claim 1, wherein said organosilicon compound is contained in said magnetic layer.

3. A magnetic recording medium according to claim 1, wherein said organosilicon compound is coated on the surface of said magnetic layer.

4. A magnetic recording medium according to claim 1, wherein from 0.3 to 5 parts by weight of said organosilicon compound are provided for each 100 parts by weight of the magnetizable particles contained in the magnetic layer.

5. A magnetic recording medium according to claim 1, which further includes an antistatic agent and a dispersing agent.

6. A magnetic recording medium according to claim 1, wherein said magnetic layer includes two or more of said organosilicon compounds in combination, each represented by the formula set forth in claim 1.

7. A magnetic recording medium according to claim 1, wherein said aliphatic group is a saturated aliphatic group.

8. A magnetic recording medium according to claim 1, wherein said aliphatic group is an unsaturated aliphatic group.

* * * * *